(12) United States Patent
Bolohan et al.

(10) Patent No.: US 12,021,457 B2
(45) Date of Patent: Jun. 25, 2024

(54) DC-DC CONVERTER WITH BRIDGE CIRCUIT FOR VOLTAGE-FREE SWITCHING, AND ASSOCIATED METHOD

(71) Applicant: BRUSA HYPOWER AG, Buchs (CH)

(72) Inventors: Nicolae Daniel Bolohan, Buchs (CH); Egi Nazeraj, St. Gallen (CH)

(73) Assignee: BRUSA HyPower AG, Buchs (CH)

( * ) Notice: Subject to any disclaimer, the term of this patent is extended or adjusted under 35 U.S.C. 154(b) by 115 days.

(21) Appl. No.: 17/425,135

(22) PCT Filed: Jan. 20, 2020

(86) PCT No.: PCT/EP2020/051222
§ 371 (c)(1),
(2) Date: Jan. 18, 2022

(87) PCT Pub. No.: WO2020/152076
PCT Pub. Date: Jul. 30, 2020

(65) Prior Publication Data
US 2023/0136912 A1    May 4, 2023

(30) Foreign Application Priority Data
Jan. 24, 2019 (DE) ..................... 10 2019 101 748.3

(51) Int. Cl.
*H02M 3/335* (2006.01)
*H02M 1/00* (2006.01)
*H02M 3/00* (2006.01)

(52) U.S. Cl.
CPC ..... *H02M 3/33592* (2013.01); *H02M 1/0058* (2021.05); *H02M 3/33573* (2021.05); *H02M 3/01* (2021.05)

(58) Field of Classification Search
CPC ............ H02M 3/335; H02M 3/33592; H02M 3/33573; H02M 1/0058; H02M 3/01
See application file for complete search history.

(56) References Cited

U.S. PATENT DOCUMENTS 6,016,258 A * 1/2000 Jain ..................... H02M 1/38
363/17
6,310,785 B1 10/2001 Ayyanar et al.
(Continued)

FOREIGN PATENT DOCUMENTS

AT    515242 A1    7/2015

*Primary Examiner* — Adolf D Berhane
(74) *Attorney, Agent, or Firm* — Hoffmann & Baron, LLP

(57) ABSTRACT

A bridge circuit including: first and second high-side switches; first and second low-side switches; a transformer having primary and secondary coils; a coil; and a current injection device; wherein the first high-side switch and the first low-side switch are connected at a first bridge terminal in a series circuit to form a first branch; the second high-side switch and the second low-side switch are connected at a second bridge terminal in a series circuit to form a second branch; the first and second branches are connected in a parallel circuit at first and second input terminals; the secondary coil has first and second output terminals; the primary coil and the coil are connected in a series circuit to connect the first bridge terminal to the second bridge terminal; and wherein the current injection device is configured to inject a predetermined current into the coil at a predetermined point in time.

9 Claims, 6 Drawing Sheets

(56) References Cited

U.S. PATENT DOCUMENTS

| | | | |
|---|---|---|---|
| 11,296,607 B2* | 4/2022 | Leibl | H02M 3/33571 |
| 11,496,042 B2* | 11/2022 | Krause | H02M 3/33584 |
| 2011/0194206 A1* | 8/2011 | Sase | H02M 3/33592 |
| | | | 360/75 |
| 2016/0172984 A1 | 6/2016 | Takagi et al. | |
| 2016/0329822 A1 | 11/2016 | Sanchez et al. | |

* cited by examiner

DC-DC CONVERTER WITH BRIDGE CIRCUIT FOR VOLTAGE-FREE SWITCHING, AND ASSOCIATED METHOD

CROSS-REFERENCE TO RELATED APPLICATIONS

The present application is the U.S. National Phase of PCT/EP2020/051222, filed on 20 Jan. 2020, which claims priority to German Patent Application No. 10 2019 101 748.3, filed on 24 Jan. 2019, the entire contents of which are incorporated herein by reference.

BACKGROUND

Field

The invention relates to the technical area of bridge circuits. In particular, the present invention relates to a bridge circuit, a DC-DC converter having the bridge circuit, a method for operating a bridge circuit, and a program element.

Related Art

For effective operation of bridge circuits, the goal is to switch them as much as possible when no voltage is applied. This type of switching is known as ZVS (Zero Voltage Switching) switching. In order to keep the circuits simple, the challenge in the case of ZVS is to set the switching times optimally and not to use complex additional circuits, such as measuring circuits that give feedback to the controller for the switches.

Particularly when a bridge circuit is operated in a high-voltage direct current network, as is used, for example, in the high-voltage circuit of an electric car, high losses can occur due to the high voltages used if the switches are not switched at the correct moment.

SUMMARY

It can be considered to be an object of the present invention to enable effective ZVS switching.

Accordingly, a bridge circuit, a DC/DC converter having the bridge circuit, a method for operating a bridge circuit, and a program element are specified.

The subject matter of the invention is specified by the features of the independent claims. Example embodiments and further aspects of the invention are specified by the dependent claims and the following description.

According to one aspect of the invention, a bridge circuit is specified. The bridge circuit has a first and a second high-side switch, a first and a second low-side switch, a transformer having a primary coil and a secondary coil, a coil, and a current injection device. In this bridge circuit, the first high-side switch and the first low-side switch are connected at a first bridge terminal in a series circuit to form a first bridge branch. In addition, the second high-side switch and the second low-side switch are connected at a second bridge terminal in a series circuit to form a second bridge branch.

The first and second bridge branch are each connected at a first and a second input terminal in a parallel circuit, wherein the secondary coil has a first and a second output terminal. The primary coil and the coil or the inductance are connected in a series circuit to connect the first bridge terminal to the second bridge terminal. The current injection device is configured to inject a predetermined current into the coil at a predetermined point in time.

According to a further aspect of the present invention, a DC/DC converter (direct current/direct current converter) having the bridge circuit according to the invention is described.

According to yet another aspect of the present invention, a method for operating a bridge circuit is specified, wherein the method includes operating the switches of the bridge circuit in such a way that a predetermined current is injected by the current injection device into the coil at a predetermined point in time.

According to another aspect of the present invention, a program element is described, having a program code which, when it is executed by a processor, is configured to execute the method for operating a bridge circuit.

According to yet another aspect of the present invention, a computer-readable storage medium is provided, on which a program code is stored which, when it is executed by a processor, executes the method for operating a bridge circuit.

A floppy disk, a hard disk, a USB (Universal Serial Bus) storage device, a RAM (Random Access Memory), a ROM (Read Only Memory), or an EPROM (Erasable Programmable Read Only Memory) may be used as a computer-readable storage medium. An ASIC (application-specific integrated circuit) or an FPGA (field-programmable gate array) as well as an SSD (solid-state drive) technology or a flash-based storage medium can also be used as a storage medium. A web server or a cloud can also be used as a storage medium. A communication network, for example, the Internet, which may permit the downloading of a program code, may also be considered to be a computer-readable storage medium. A radio-based network technology and/or a wired network technology can be used.

The use of a current injection device can ensure that energy present is withdrawn from a switch of the bridge circuit to switch the switch in a state that is as deenergized as possible. In particular, the current injection device can ensure that the switch is assisted during switching upon the withdrawal of the energy. This injected current can also enable a live node to be discharged rapidly and thus promote ZVS switching. For example, the output capacitance or parasitic capacitance of the first high-side switch is discharged and the output capacitance or parasitic capacitance of the first low-side switch is charged and the first bridge terminal moves from an upper potential to a lower potential or ground potential, whereby ZVS switching can then be achieved for the first low-side switch.

According to another aspect of the present invention, the current injection device is a further coil which, in combination with the coil, forms a second transformer or an additional transformer.

According to a further aspect of the present invention, coupling between the further coil and the coil is low. In other words, the coupling between the further coil and the coil is less than the coupling between the primary coil and the secondary coil of the transformer. For example, a coupling of the further coil and the coil has a lower magnetic coupling factor than the coupling between the primary coil and the secondary coil of the transformer.

This low coupling factor of the ZVS transformer may allow a current to be injected into the coil but not to load the circuit with a high voltage. In other words, the low coupling factor of the ZVS transformer can enable providing a high leakage inductance of the ZVS transformer, which allows magnetic energy to be stored, but which essentially only has a minor influence on the output capability of an inverter. If the ZVS transformer, which includes the coil and the current injection device, had a high or good coupling factor in contrast to the low coupling factor, the remaining inductance would not be sufficient to combine or withdraw the energy which is required for ZVS conditions. The high leakage inductance or the leakage inductance of the ZVS transformer is used to generate or inject a current that is required to achieve ZVS (Zero Voltage Switching).

The magnetic coupling factor between the further coil and the coil may have a value of approximately 0.9 with a maximum possible value of 1. Coupling factors of typical power transformers may be in the range of 0.995. The main transformer may also have a magnetic coupling factor of approximately 0.995, which is thus significantly greater than the magnetic coupling factor of the ZVS additional transformer, which is approximately 0.9.

According to another aspect of the present invention, the bridge circuit furthermore has a high-side capacitor and a low-side capacitor. The high-side capacitor and the low-side capacitor are connected in series at a third bridge terminal to form a third bridge branch, wherein the third bridge branch is connected to the first and second input terminal and wherein the further coil connects the third bridge terminal to at least one of the first bridge terminal and the second bridge terminal. The two capacitors, the high-side capacitor and the low-side capacitor, keep the ZVS transformer at a medium voltage potential. The magnetic core of the ZVS transformer is thus balanced and the first high-side switch and the first low-side switch can be controlled using a symmetrical switching pattern.

According to yet another aspect of the present invention, the bridge circuit has a synchronous rectifier. The synchronous rectifier is connected to the first and second output terminals.

In contrast to diodes, the synchronous rectifier can be actively controlled. The control can be designed in such a way that the synchronous rectifier is short-circuited for a predeterminable duration during a freewheeling phase of the bridge circuit or the phase-shifted full bridge. By short-circuiting the synchronous rectifier during the freewheeling phase of the bridge circuit, the current in the ZVS additional transformer can be increased, in particular, an additional current can be injected into a coil of the ZVS additional transformer $T_{ZVS}$. This additional current can be used to enable ZVS switching and/or ZCS switching of the high-side switch and/or low-side switch associated with the respective switching phase in that this switch carries out a transition from one switching state to the other, essentially without a voltage being applied across this switch.

According to yet another aspect of the present invention, the bridge circuit has a control unit which is connected to each of the first and second high switches and low switches. The control unit is configured to operate the switches in such a way that the predetermined current is injected into the coil by the current injection device at the predetermined point in time. Secondary-side switches may also be used for the injection, for example, switches of a secondary-side rectifier and/or of the synchronous rectifier. This switching of the switches may take place during a freewheeling phase.

The control unit may, for example, be configured in such a way that it operates secondary-side switches so that the predetermined current is injected into the coil. The secondary-side switch or switches may be switches of a secondary-side rectifier and/or of a synchronous rectifier. The secondary switch and/or the plurality of secondary switches may be implemented by MOSFET components. The level of the injected current may be indirectly determinable by the time duration for which one, the two, and/or the plurality of secondary switches are switched simultaneously and thus the one, the two, and/or the plurality of secondary coils are short-circuited. This short-circuiting of the secondary coil and/or of the plurality of secondary coils may take place during a freewheeling phase of one of the high-side switches and/or the low-side switches.

According to yet another aspect of the present invention, the control unit is furthermore configured to operate the high-side switch and/or switches and/or the low-side switch and/or switches in such a way that the predetermined current is injected into the coil when the current through the coil is below a predeterminable threshold value at the predetermined point in time.

BRIEF DESCRIPTION OF THE DRAWINGS

Further example embodiments of the present invention are described hereinafter with reference to the figures.

DETAILED DESCRIPTION

The illustrations in the figures are schematic and not to scale. In the following description of FIG. 1 to FIG. 5b, the same reference numbers are used for the same or corresponding elements.

In this text, the terms "capacitor" and "capacitance" as well as "coil" or "choke" and "inductance" may be used synonymously and should not be interpreted restrictively unless otherwise specified.

The term "high-side" may refer to a connection to a live potential. The term "low-side" may refer to a connection to a reference potential.

Figure 1:
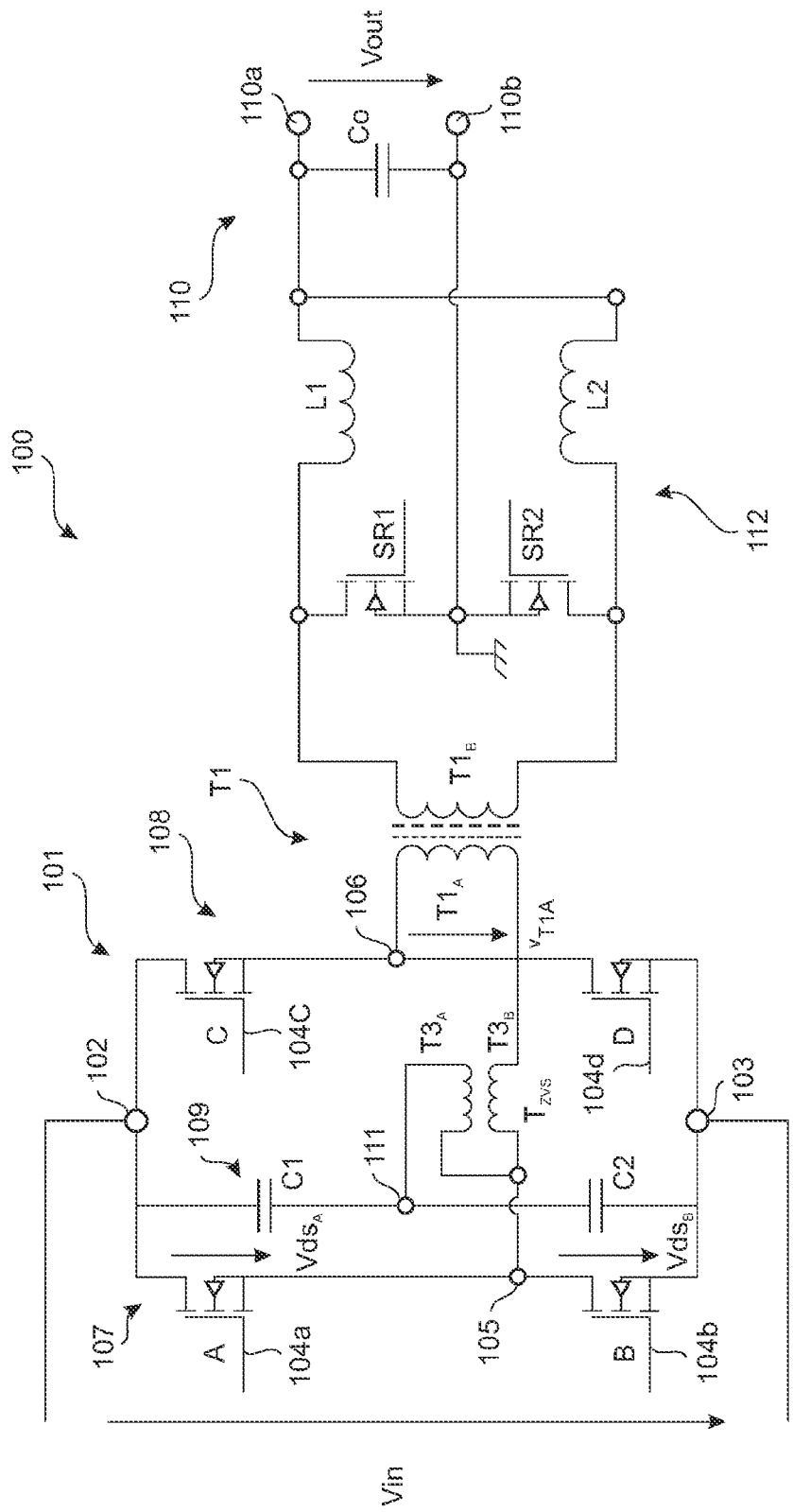
FIG. 1 shows a block diagram of a DC-DC converter having a bridge circuit according to one example embodiment of the present invention.

FIG. 1 shows a block diagram of a DC-DC converter 100 having a bridge circuit 101 according to one example embodiment of the present invention. Using this switching arrangement, good switching conditions for the switching devices or switches A, B, C, D of a phase-shifted full bridge (PSFB) 101 or a bridge circuit 101 having phase-shifted switching behavior can be achieved. These good switching conditions may be achieved if a substantially voltage-free switching of the respective active switches A, B, C, D can be produced. The voltage-free switching, ZVS (Zero Voltage Switching) or zero voltage switching enables high switching losses to be avoided, which can arise in particular when switching high voltages due to parasitic elements in switches A, B, C, D, since energy may be stored in these parasitic elements against which it is necessary to work when switching the switches A, B, C, D. Alternatively or additionally to ZVS switching, currentless switching can also be achieved (ZCS, Zero Current Switching).

A bridge circuit 101 can be used, for example, in a DC-DC converter 100, to convert an input voltage $V_{in}$ into an output voltage $V_{out}$. $V_{in}$ and $V_{out}$ are DC voltages (DC, direct current). On the way from the input to the output, the input DC voltage $V_{in}$ is converted by the bridge circuit 101 into an AC voltage (AC, alternating current) and converted again into the output DC voltage by rectification. Particularly in applications that are used in an OBC unit (On Board Charging Unit) of an electric or hybrid vehicle, it can be necessary to convert very high voltages $V_{in}$ (HV) into typical on-board voltages $V_{out}$ of approximately 12V, which can be used to operate a radio, for example. The voltages $V_{in}$ are provided, for example, by the direct current intermediate circuit of the electric vehicle. Alternatively, the voltage $V_{in}$ can also come from the on-board component of a charging device.

The DC-DC converter 100 can be used instead of a generator (alternator) of a vehicle to provide the on-board voltage 12V. In one example, the 12V on-board voltage is not generated directly by mechanical work, but rather by the DC-DC converter 100 converting the high voltage (HV) of an HV battery (DC voltage, DC) into the 12V on-board voltage of an EV (electrical vehicle) or PHEV (plug-in hybrid electric vehicle). The HV is present in a load circuit or intermediate circuit of a power supply system of a vehicle. The energy withdrawn from the HV circuit is used to charge a 12V on-board supply battery to which the 12V consumers are connected. If the 12V battery were not continuously recharged from the HV circuit via the DC-DC converter, the connected consumers would discharge the 12V battery, similar to how the alternator would fail when using a mechanical energy supply.

The OBC unit (not shown in FIG. 1) that supplies $V_{in}$ is used to charge the HV battery of the intermediate circuit. The voltage of the HV battery can be $V_{in}=400V$ or 800V. The OBC unit draws its energy itself, for example, from an AC power supply (also not shown in FIG. 1), the so-called mains, for example, via an alternating current or three-phase connection. Therefore, the voltages $V_{in}$ of the HV DC voltages (DC) can be in the range of 400V-800V or in a range less than 800V. The bridge circuit 101 is configured so that it can deal with voltages of an appropriate dimension and variation range.

The voltage $V_{in}$ is supplied to the bridge circuit 101 via a first input terminal 102 and via a second input terminal 103. The first input terminal 102 may be referred to as the high-side terminal 102 and the second input terminal 103 may be referred to as the low-side terminal 103. These input terminals 102, 103 form a parallel circuit of the first 107 and second 108 bridge branches. The first bridge branch 107 is formed from a series circuit of the first high-side switch A and the first low-side switch B. The second bridge branch 108 is formed from the series circuit of the second high switch C and the second low-side switch D. The first high-side switch A has the control terminal 104a, the first low-side switch B has the control terminal 104b, the second high-side switch C has the control terminal 104c, and the second low-side switch D has the control terminal 104d. The control terminals 104a, 104b, 104c, 104d are connected to a control unit (not shown in FIG. 1), which ensures the phase-shifted control of the switches A, B, C, D. The control is carried out by the control unit in such a way that the first high-side switch A and the second low-side switch D are switched essentially simultaneously. And so that the second high-side switch C and the second low-side switch B are switched simultaneously. It can also be provided that a pause or dead time is provided between the switching of the switches associated with one another, during which no switch is switched and during which all switches are open. During the switching process, a duty cycled of 50% is essentially provided, so that the switch combinations A, D and B, C are active for essentially the same length of time.

The switch pairs A, D and B and C, which are switched essentially simultaneously, are arranged diagonally to the coil $T1_A$ and/or the coil $T3_B$, so that the paired switching of the switch pairs A, D and/or B, C ensures a reversed current flow through the coil $T3_B$ in each case. The control pattern for the phase-shifted control of the switches A, B, C, D essentially corresponds to a conventional control pattern or control scheme used for a phase-shifted switching full bridge (PSFB).

Figure 4A:
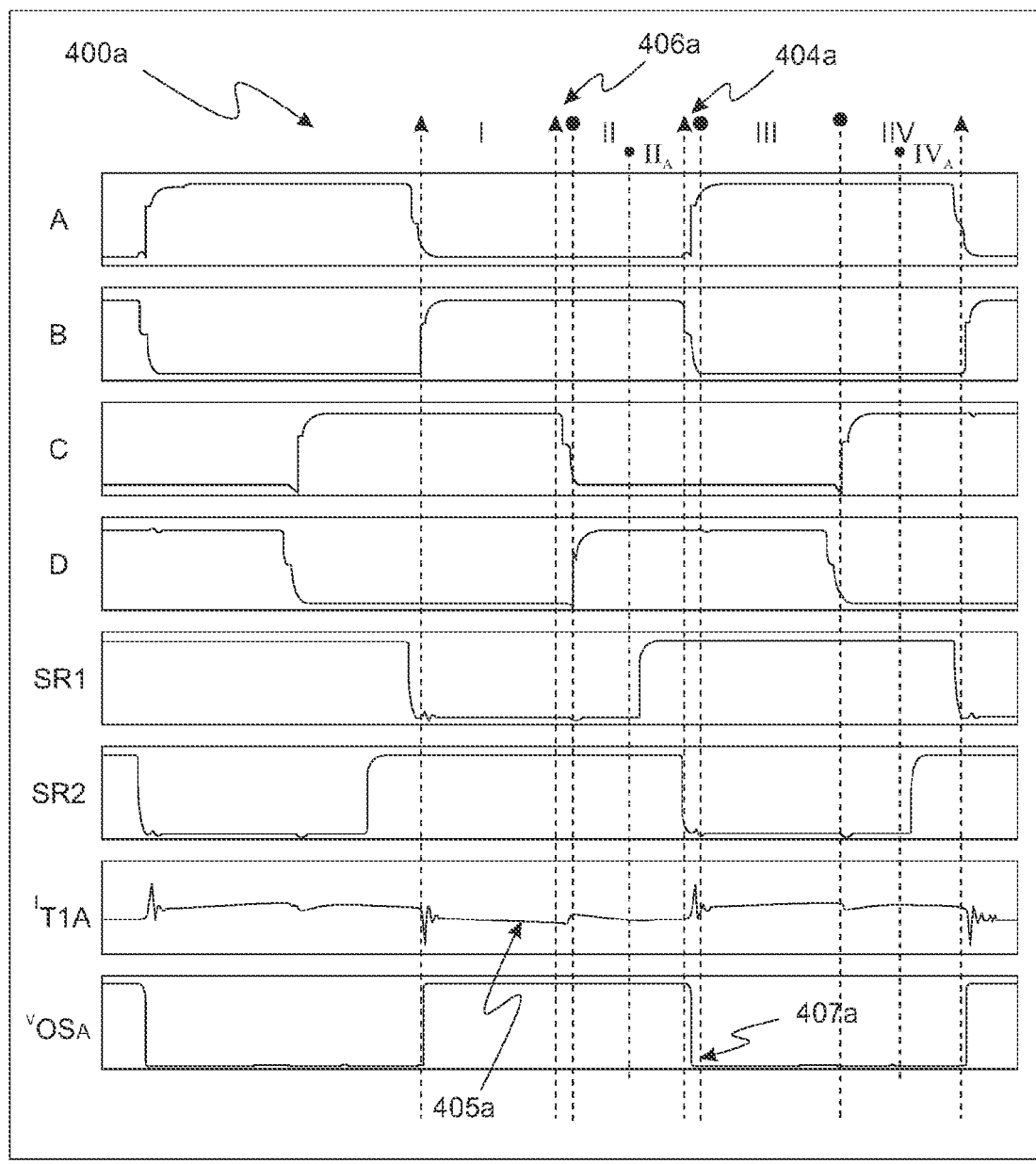
FIG. 4a shows diagrams of various signal profiles of a PSFB without use of the additional transformer according to one example embodiment of the present invention.

FIG. 4a shows diagrams of various signal curves, in particular voltage curves and current curves as a function of a switching behavior of a bridge circuit 101 and/or a synchronous rectifier SR1, SR2 without using the additional transformer according to one example embodiment of the invention.

FIG. 4a shows a diagram 400a of an expanded signal curve of a PSFB with lagging A/B without using the additional transformer according to an example embodiment of the present invention. Circuit diagram 400a shows a selection of signal curves for an operation of a phase-shifted full bridge converter circuit without ZVS transformer $T_{ZVS}$. In the switching phase 406a or transition phase 406a, as shown at point 405a, the current $I_{T1A}$ through the primary coil decreases, since the leading branch C, D is switched in this phase. During the freewheeling phase II, which follows the phase 406a, the current $I_{T1A}$ decreases further, since, due to the simultaneous connection of switches B, D, a circuit having switch B, switch D, and the primary coil $T1_A$ is formed. The current decreases due to the current flow circulating in this freewheeling circuit. The circuit formed in the freewheeling phase II behaves like an RL circuit, which is formed from the line resistances and the primary coil $T_{1A}$. The line resistances result in losses caused by the current that flows to dissipate the stored magnetic energy. Due to the losses occurring during the freewheeling phase II, the magnetic energy stored in the inductance $T1_A$ during the switching or transition phase 404a of the lagging branch 107 (lagging leg transition) A, B is lower than in the transition phase 406a of the leading branch 108 (leading leg transition) C, D. As a result, there is not enough magnetic energy available to completely discharge the parasitic capacitances of switches A, B of the lagging branch, for example, the parasitic capacitances of a MOSFET switch A, B.

Figure 4B:
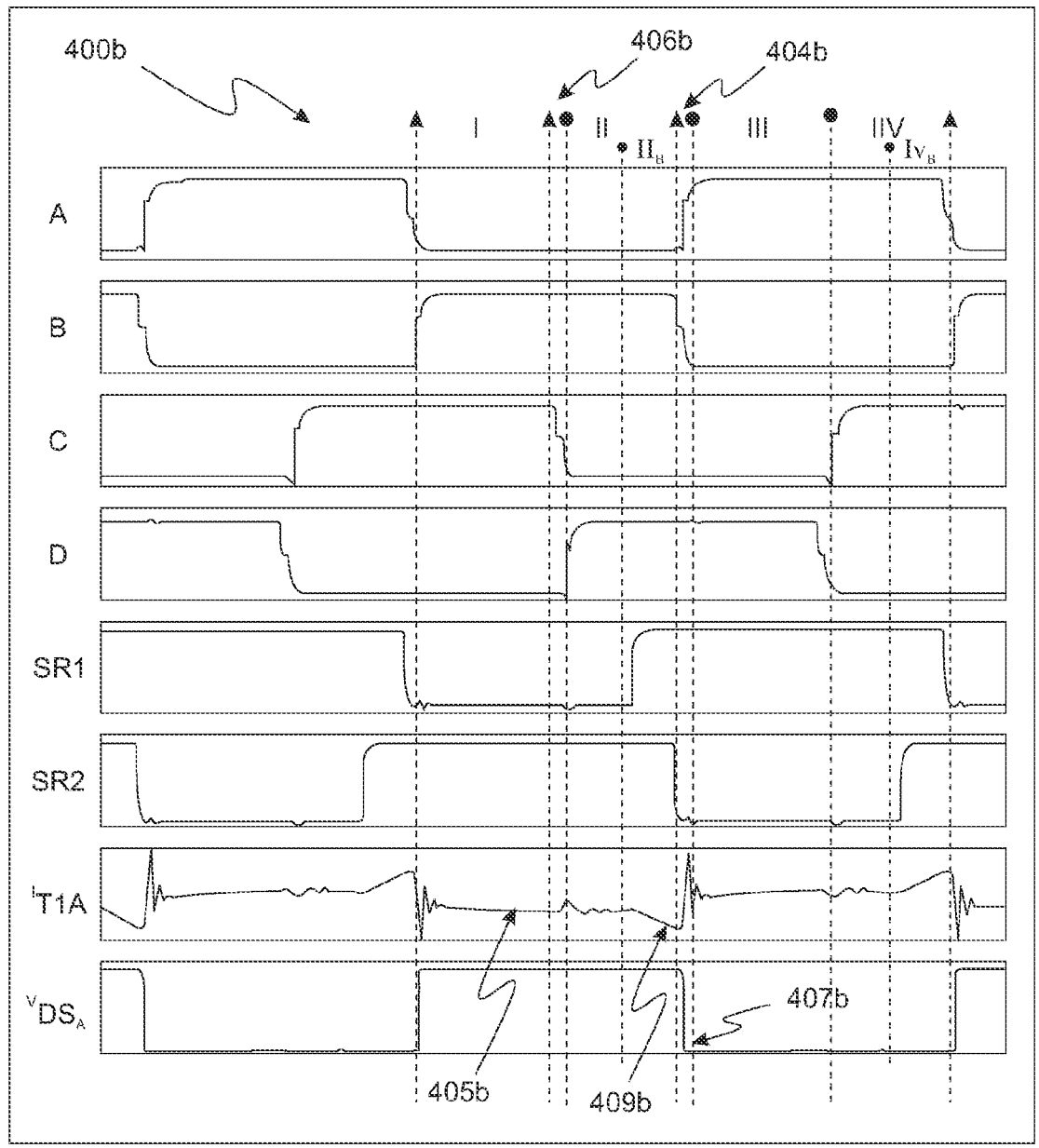
FIG. 4b shows diagrams of various signal profiles of a PSFB with use of the additional transformer according to one example embodiment of the present invention.

FIG. 4b shows diagrams of various signal curves, in particular voltage curves and current curves as a function of a switching behavior of a bridge circuit 101 and/or a synchronous rectifier SR1, SR2 without using the additional transformer $T_{ZVS}$ according to one example embodiment of the invention. In particular, during the end phase $II_B$ of the freewheeling phase II, in which the low-side switches B 104b and D 104d and synchronous rectifiers SR1 and SR2 are switched simultaneously and form the low-side freewheeling circuit 104b, 104d, $T3_B$, and $T1_A$, the current $I_{T1A}$ rises further after the switching phase 406b because the $T3_B$ winding of the $T_{ZVS}$ transformer is short-circuited, while at the same time essentially half the input voltage is applied to the $T3_A$ winding of $T_{ZVS}$. The increase of the primary current $I_{T1A}$ lasts until the switching time 404b of the lagging branch (lagging leg) A/B, in which the low-side switch B 104b is switched off and the high-side switch A 104a is switched on. In other words, the increase in the primary current $I_{T1A}$ allows the available magnetic energy to increase during the transition 404b of the lagging branch (lagging leg) A/B. Thus, the transition phase 404b of switching the lagging branch 107 A/B can take place as a soft transition and soft ZVS switching on of the switch A 104a can be carried out.

The circuit diagram 400b shows, as drain-source voltage $Vds_A$, the curve of the voltage across the high-side switch A, i.e., the curve of the voltage between terminal 102 and bridge point 105 in the first bridge branch 107 for the case that the additional transformer $T_{ZVS}$ is used according to FIG. 1. Circuit diagram 400a shows, as drain-source voltage $Vds_A$, the corresponding voltage curve for the case that no additional transformer is used and thus only the primary coil $T1_A$ is solely responsible for the switching of the high switch A.

Figure 5A:
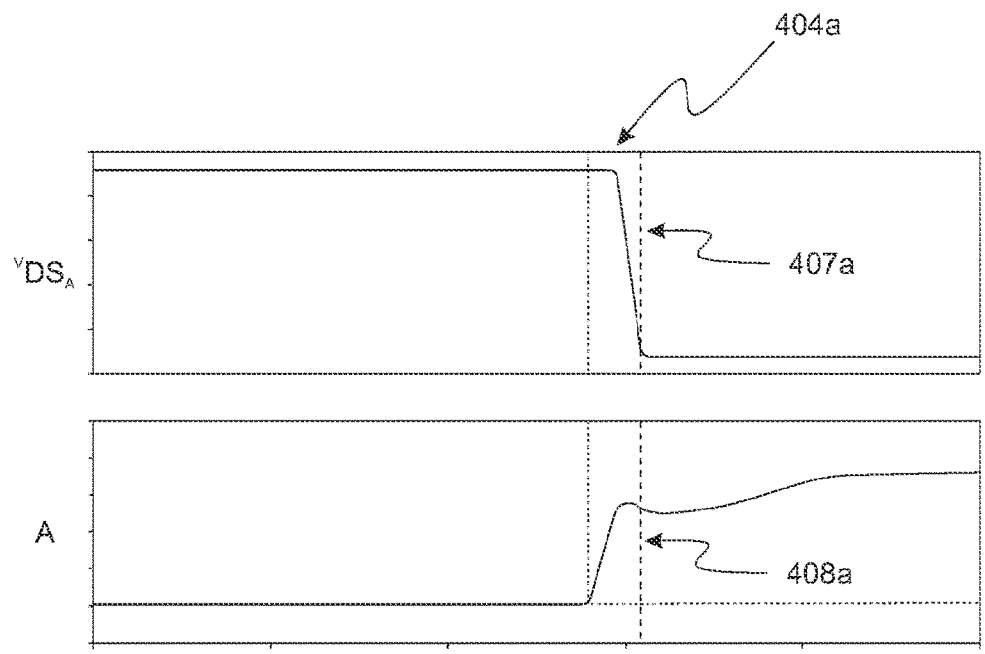
FIG. 5a shows a detail from diagram 4a according to one example embodiment of the present invention.

FIG. 5a shows a detail from diagram 4a according to one example embodiment of the present invention. This shows the switching phase 404a of the switch A of the lagging branch 107, in particular the control voltage of the switch A, for example, the gate voltage if the switch A is implemented as a MOSFET. The presence of a Miller plateau 408a in the voltage curve A indicates that the switch A cannot be discharged before the switching process is carried out, as can also be seen from the point 407a of the curve of the switching signal $Vds_A$, so that only hard switching takes place.

Figure 5B:
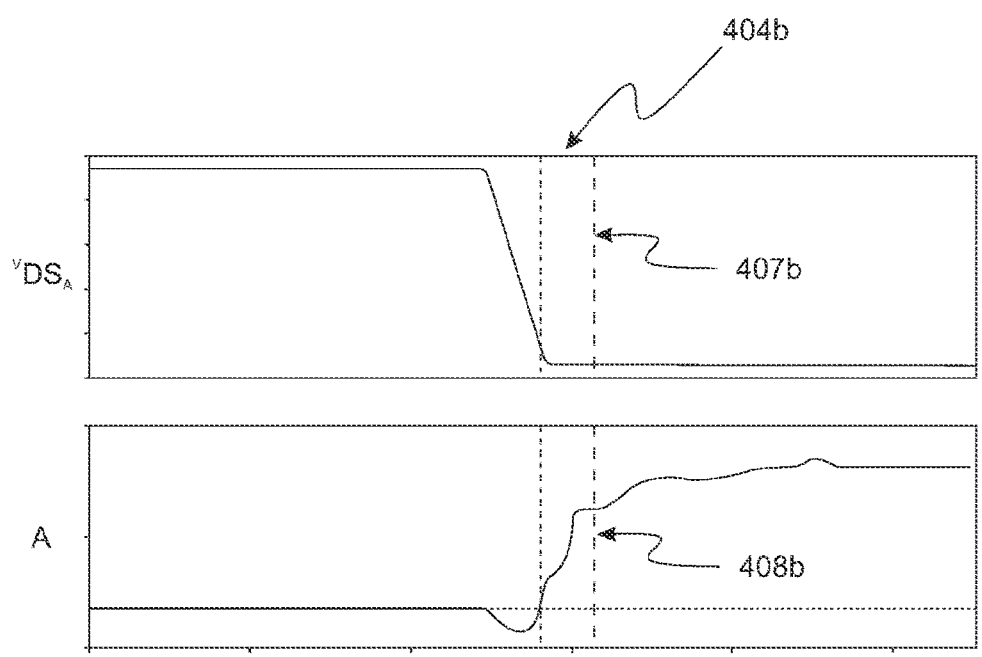
FIG. 5b shows a detail from diagram 4b according to one example embodiment of the present invention.

FIG. 5b shows a detail from diagram 4b according to one example embodiment of the present invention. FIG. 5 shows the ZVS switching process of switch A 104a. Assuming that the switch A is implemented as a MOSFET, there is no Miller plateau at point 408b of the curve of the gate voltage of the switch A after the switching process in switching phase 404b. The voltage across the switch A 104a, for example, the drain-source voltage $Vds_A$, has already dropped to 0V when it is switched, as is illustrated at point 407b. This enables complete ZVS switching and a soft transition.

The voltage curve of the control voltage of the input switches A, B when controlled by PWM (pulse-width modulation) is shown in FIG. 4b when the additional transformer $T_{ZVS}$ is used.

In FIGS. 4a, 4b, 5a, 5b, the signal A corresponds to the gate voltage Vg at the switch A 104a, the signal B to the gate voltage Vg at the switch B 104b, the signal C to the gate voltage Vg at the Switch C 104c, and the signal D to the gate voltage Vg at switch D 104d. According to FIG. 1, switches A 104a, B 104b, C 104c, D 104d are designed as normally blocking MOSFETs. This means that the application of a voltage to the respective gate or a high pulse in diagram 400a, 400b corresponds to a closed switch through which current can flow. The use of self-conducting MOSFETS is also possible with an inverse sign.

The signal SR1 corresponds to the gate voltage at the switch SR1. The signal SR2 corresponds to the gate voltage at the switch SR2.

The signal $I_{T1A}$ corresponds to the time curve of the primary current through the coil $T1_A$, in particular through the primary coil $T1_A$.

The signal $Vds_A$ corresponds to the time curve of the drain-source voltage in the switch A.

To simplify and to illustrate the influence of $T_{ZVS}$, in particular the increase in current of $I_{T1A}$ caused thereby, the comparisons in FIGS. 4a, 5a, 4b, 5b show the same control pattern of switches A, B, C, D, SR1, SR2, although a different control pattern would possibly be used in a PSFB without $T_{ZVS}$ according to FIG. 4a, since, for example, the switches SR1, SR2 would not be short-circuited simultaneously during the freewheeling phase II to achieve ZVS switching.

A bridge branch 107, 108 can be referred to as a leg 107, 108. In the PSFB switching method considered below, the second bridge branch 108 or leg CD 108, which has switches C and D, is controlled as a leading branch (leading leg) 108.

The first bridge branch 107 or leg AB 107, which has the switches A and B, is controlled as a lagging branch (lagging leg) 107. The reverse control is also possible. In the PSFB switching method, leg CD 108 is phase shifted with respect to leg AB in order to control and/or regulate the output voltage $V_{out}$ by way of the phase offset.

In a PSFB switching method or control method, there are essentially four main phases or four main events. In the following, the differences compared to a standard PSFB, which arise due to the use of the ZVS transformer $T_{ZVS}$, are discussed.

Diagram 400a shows the control pattern for switches A, B, C, D for the case that no ZVS transformer $T_{ZVS}$, that is to say no coil $T3_A$ and no coil $T3_B$, is used. The time curve of diagram 400a is essentially divided into four phases I, II, III, and IV.

In contrast, the diagram 400b shows the control pattern for the switches A, B, C, D for the case that the ZVS transformer $T_{ZVS}$ is used, that is to say, that the coil $T3_A$ and the coil $T3_B$ are used.

The control patterns for the switches A, B, C, D essentially match both for diagram 400a and also for diagram 400b. Likewise, the division into phases I, II, III and IV.

The control patterns of the synchronous rectifiers SR1, SR2 in the diagrams 400a and 400b also correspond.

The individual phases I, II, III, IV are described below.

1. In phase I, the switches B 104b and C 104c are switched on or activated ("B & C on"). This phase I is called the energizing phase. During this phase, energy and/or power is transmitted from the supply source $V_{in}$, for example, the HV battery, which is connected to the nodes 102, 103, to the load (not shown in FIG. 1) at the terminals 110a, 110b, $V_{out}$. The current flow thus takes place in phase I essentially via node 102, switch C, primary coil $T1_A$ and, if the coil $T3_B$ is present, via $T3_B$, via switch B to node 103.

1.a) In the following, phase I is considered for the case that no transformer $T_{ZVS}$ is provided, thus for the case that neither coil $T3_A$ nor coil $T3_B$ is present. The associated signal curves are shown in FIGS. 4a, 5a. For the case that no transformer $T_{ZVS}$ is provided, after the switching of the switch B, due to the switching of the lagging branch 107, which initiates phase I, the current $I_{T1A}$ increases in the main transformer $T1_A$ with a slope according to the formula:

$$\frac{di}{dt} = \frac{V_{in} - V'_0}{L'_1} \tag{1}$$

Here, i denotes the current $I_{T1A}$ through the primary coil $T1_A$, Vo' denotes the voltage at the primary coil $T1_A$, which is reflected by the voltage $V_{out}$ at the terminals 110a, 110b at the load (not shown) via the transformer T1 on the primary side of the transformer $T1_A$. Vo' corresponds to $n*V_{out}$, wherein n is the number of turns of the transformer T1. $L_1'$ denotes the inductance of the coil T1$_A$. The bar at V$_o$' and L$_1$' indicates that they are values which have been reflected in the primary coil T1$_A$.

During phase I, the current I$_{T1A}$ flows from node 102, via switch C, via the primary coil T1$_A$, via switch B into node 103.

Only during the further energizing phase III "A&D on" described below is the reflected output inductance L$_1$' assumed to be very much greater than the leakage inductance of the transformer T1. The leakage inductance that results during the transmission from T1$_A$ to T1$_B$ of the transformer T1 is not shown in FIG. 1, since it is a fictitious quantity that does not correspond to any physical component. However, it can be set via the type of the transformer.

1.b) If in addition, as shown in FIGS. 4b, 5b, the ZVS transformer T$_{ZVS}$ is provided in series with T1, the ZVS transformer T$_{ZVS}$ with its coils T3$_A$ and T3$_B$ increases the voltage across the primary coil T1$_A$ of the main transformer T1 during phase I. Thus, the slope of the current changes in relation to formula (1) during the energizing phase I, if the ZVS transformer T$_{ZVS}$ is provided, to:

$$\frac{di}{dt} = \frac{V_{in}\left(1+\frac{1}{2n_{ZVS}}\right) - V_0'}{L_1'} \quad (2)$$

Here, i again denotes the primary current I$_{T1A}$, n$_{ZVS}$ the number of turns of the ZVS transformer T$_{ZVS}$, and 2n$_{ZVS}$ twice the number of turns, wherein it is assumed that the coils T3$_A$ and T3$_B$ have the same number of turns n. In the energizing phase I "B&C on", only the change in the current I$_{T1A}$ through the primary coil over time is affected by the provision of the ZVS transformer T$_{ZVS}$ and therefore essentially no changes result in relation to the control method of a PSFB circuit in which the ZVS transformer T$_{ZVS}$ is not is provided. The greater the number of turns n$_{ZVS}$ of the ZVS transformer T$_{ZVS}$, the less noticeable the ZVS transformer T$_{ZVS}$ is.

2. The transition phase 406a, 406b between phase I and phase II arises due to the essentially simultaneous switching of switches C, D of the leading branch 108. During the transition phase 406a, 406b, the switch C 104c is turned off, via which the current I$_{T1A}$ has been supplied in phase I, and the switch D 104d is turned on (turn-off C/turn-on D). This transition phase 406a, 406b is referred to as the transition of the leading bridge branch 108 (leading leg transition).

2.a) In the case of FIGS. 4a, 5a that no transformer T$_{ZVS}$ is provided, in order to achieve a soft transition (ZVS) and avoid hard switching, the parasitic capacitance of switches C and D is essentially completely discharged or charged during transition phase 406a. The energy used for the discharging and/or charging is absorbed or emitted by the leakage inductance (not shown in FIG. 1) of the primary winding T1$_A$ in the form of magnetic energy. The magnetic energy of the leakage inductance of the primary winding T1$_A$ is determined as follows:

$$\Delta E_L = \frac{1}{2} L_{lk} I^2 \quad (3)$$

Herein $\Delta E_L$ denotes the change in energy in the primary-side leakage inductance L$_{lk}$ of transformer T1 and I denotes the current I$_{T1A}$ through the primary coil T1$_A$. However, this formula generally relates to achieving a ZVS condition by the switches A and B and is not limited to phase II. If there is sufficient current in the main transformer T1A, C and D are switched and ZVS can also be achieved for these two switches. To achieve a soft transition when switching A and B (ZVS), the following condition is to be met:

$$\Delta E_L > \Delta E_c = \left(\frac{4}{3}C_{mos} + \frac{1}{2}C_{tr}\right)V_{in}^2 \quad (4)$$

The change in the inductive energy stored in the primary-side leakage inductance of T1 is to be greater than the change in the capacitive energy $\Delta E_C$ stored in the parasitic capacitances C$_{mos}$ of the switches A and B. In other words, the primary-side leakage inductance is to be dimensioned so that this condition is met. Formula (4) expresses that the energy stored in the leakage inductance of the coil T1$_A$ has to be greater than the energy which is stored in the parasitic capacitances C$_{mos}$ of the switches C and D and the energy which is stored in the parasitic capacitance C$_{tr}$ of the transformer T1. Usually, the switching process "turn-off C/turn-on D" of the leading branch 108 is a soft transition during the transition phase 406a, since the current I$_{TA1}$ is at its maximum value and the energy of the leakage inductance is sufficiently large to completely charge or discharge the capacitances C$_{mos}$ and C$_{tr}$.

During the transition phase 406a, which follows the end of the energizing phase I, the two switches C, D of the leading branch 108 (leading leg) 108 are switched essentially simultaneously. There is only a short dead time between the switching off of C and the switching on of D. The closed switch C of the leading branch 108 is opened during the transition phase 406a and the open switch D of the leading branch 108 is closed "turn-off C/turn-on D". Since the switches A, B of the lagging branch 107 are not yet actuated, switch A remains open and switch B remains closed.

Due to this asymmetrical and chronologically differing switching of the switches C, D of the leading branch 108 and the switches A, B of the lagging branch 107, during the transition phase 406a, the state of phase II results, in which the high switches A, C are open and the low switches B, D are closed simultaneously. Due to this switching behavior, a loop or freewheeling loop is formed in the lower region in the vicinity of the low-side node 103. The primary coil T1$_A$ drives the current flowing during phase I via the primary coil T1$_A$ and via switch B, via node 103, and via switch D. Since switches A, C are open and/or are opened during transition phase 406a and since the current still flowing through T1$_A$ is sufficiently large to discharge parasitic charges from the bridge point 106 and thus from the switches C, D, both switch C and switch D can essentially be switched under ZVS conditions in the transition phase 406a.

2.b) If the ZVS transformer is provided, the diagrams 400b result, as shown in FIGS. 4b, 5b. During the transition phase 406b, these diagrams essentially do not differ from the transition process 406a described in section 2.a), in which no ZVS transformer is provided. The control method is also essentially the same. However, in the case of the coil T3$_B$ connected in series in addition to the primary coil T1$_A$, the primary coil T1$_A$, because of the drop of the current, continues to drive the current I$_{T1A}$ flowing during phase via the primary coil T1$_A$ and via the coil T3$_B$, and via the switch B, the node 103, and the switch D. The freewheeling loop thus has the primary coil T1$_A$, the coil T3$_B$, the switch B, the low-side node 103, and the switch D.

3. Phase II following the transition phase 406a, 406b is referred to as the freewheeling phase II. During this freewheeling phase II, the low-side switches B 104b and D 104d are switched on (B & D on), i.e., closed and the high-side switches A, C are open.

3.a) In the case of FIGS. 4a, 5a, that no transformer $T_{ZVS}$ is present, during this phase II "B & D on", the two low-side switches B and D are switched on or closed and the two terminals 105, 106 of the primary coil $T1_A$ of the main transformer T1 are connected to the input terminal 103. Both input terminals 105, 106 of the transformer T1 are thus at the same potential and there is no voltage applied across the transformer T1. However, the primary coil $T1_A$ continues to drive the current $I_{T1A}$. However, this current $I_{T1A}$ through the primary winding $T1_A$ decreases exponentially according to an RL circuit—a circuit having coil and resistor:

$$I(t) = I_p e^{\left(\frac{2r_{ds,on}}{L_{lk}}\right)t} \qquad (5)$$

Here, $I_p$ is the peak current that flows during the transition phase 406a "transition of the leading branch (leading leg transition)" described in section 2. following the energizing phase I. The resistance value $r_{ds,on}$ is the on resistance of the switch B or D, for example, of the MOSFET B or D.

The end of the freewheeling phase II determines the further transition phase 404a, which is characterized in that the switches A, B of the lagging branch 107 are switched in this further transition phase 404a. The high-side switch A is switched on or closed and the low-side switch B is switched off or opened. If the leakage inductance is too small and/or insufficient current $I_{T1A}$ flows through the primary winding $T1_A$ of the main transformer T1, ZVS switching cannot be achieved for this switching process of the lagging branch 107 in the transition phase 404a. This is because if only the leakage inductance of T1 were increased, this would influence the output capability. Therefore, increasing the leakage inductance is substantially avoided. The current cannot readily be increased either. However, the use of the ZVS transformer and the simultaneous activation of the switches SR1 and SR2 during the freewheeling phase were capable of increasing the current.

3.b) If, as provided in FIGS. 4b, 5b, according to FIG. 1 the ZVS (Zero Voltage Switching) transformer $T_{3A}$, $T_{3B}$ is additionally provided as a series circuit to the transformer T1 between the bridge points 105, 106, there are differences in the control from a case in which the ZVS transformer $T_{ZVS}$ is not provided. This is because even if the leakage inductance is too small and/or if sufficient current $I_{T1A}$ would not flow through the primary winding $T1_A$ of the main transformer T1, the current $I_{T1A}$ through the primary winding $T1_A$ of the main transformer T1 can be increased if the ZVS transformer takes advantage of the fact that during the freewheeling phase II before the transition phase 404b, the synchronous rectifiers SR1, SR2 are activated or closed at the same time. Before the switches A, B of the lagging branch 107 are switched, the synchronous rectifiers SR1, SR2 are activated or closed at the same time, whereby the output 110a, 110b and in particular the secondary coil T1B are short-circuited. This simultaneous activation of SR1, SR2 generates an additional current pulse in the primary coil $T1_A$, which increases the current $I_{T1A}$ and thus also has the effect of increasing the current through the ZVS transformer.

Therefore, no change needs to be made to the switching behavior of the synchronous rectifiers SR1, SR2 in relation to FIG. 4a. The actuation of the switches SR1, SR2 according to FIG. 4a could be omitted for the control of a PSFB without ZVS transformer and is only shown in FIG. 4a for a better comparison. It also shows that the current does not increase without a ZVS transformer despite switching SR1, SR2.

If, however, the ZVS transformer is present, the ZVS transformer can be used to simultaneously activate the synchronous rectifiers SR1, SR2 during the freewheeling phase II, $II_B$ even during the transition phase 404b, to provide ZVS conditions for switching the switches A, B during the transition phase 404b.

In other words, in order to take advantage of the presence of the ZVS transformer $T_{ZVS}$, even during phase II "B & D on", during which the low-side switches B and D switch the bridge points 105, 106 on the primary side to the same potential, the secondary-side coil $T1_B$ of the transformer T1 is short-circuited by the two switches SR1 and SR2 of the output rectifier circuit 112 or the secondary side 112 being activated or switched on, which are implemented, for example, by MOSFET transistors. The part of the freewheeling phase II, during which the synchronous rectifiers SR1 and SR2 are switched on at the same time, is located at the end of the freewheeling phase II and designated $II_A$ or $II_B$. If the ZVS transformer $T_{ZVS}$ is present, the current $I_{T1A}$ decreases during this end phase $II_B$, as shown in FIG. 4b, while without ZVS transformer $T_{ZVS}$ there is an increase in the current $I_{T1A}$ in the end phase $II_A$, as can be seen in FIG. 4a.

In phase II, a closed circuit is formed from the series circuit of the ZVS secondary coil $T3_B$, the primary coil $T1_A$, and the two switches B and D by activating the low-side switches B and D. While this primary-side circuit is formed by the first low-side switch B and the second low-side switch D simultaneously connecting the negative potential to the bridge terminals 105 and 106, the two switches SR1, SR2 of the secondary-side rectifier are activated shortly before the control of the switches A, B of the lagging branch 107 during the end phase $II_A$, $II_B$. According to FIGS. 4a and 4b, only the first synchronous rectifier SR1 is activated in the end phase $II_A$, $II_B$, since the second synchronous rectifier SR2 is already activated.

The second synchronous rectifier SR2 is switched off before the further transition phase 404a, 404b, that is to say before the switches A, B of the lagging branch 107 are actuated. As a result of this control of the two switches SR1, SR2 in the end phase $II_A$, $II_B$, the two terminals of the secondary coil $T1_B$ are simultaneously connected to the same potential, for example, to the ground potential, before the transition phase 404a, 404b of the lagging branch 107, and in this way a circuit made up of the secondary coil $T1_B$ and the two switches SR1, SR2 is formed on the secondary side.

In the circuit formed on the primary side by the switches B and D and the coils $T3_B$ and $T1_A$, freewheeling is generated during phase II, since the collapsing magnetic field in the coils $T3_B$ and $T1_A$ maintains the primary current $I_{T1A}$ and the leakage inductance $L_{lk}$ of main transformer T1 receives its current from $T_{ZVS}$, in particular from $T3_B$, and the current through $T1_A$ continues to increase. The slope of the current $I_{T1A}$ is calculated according to:

$$\frac{di}{dt} = \frac{V_{in}}{n_{ZVS}L_{lk}} - I_p e^{\left(\frac{2r_{ds,on}}{L_{lk}}\right)t} \qquad (6)$$

This additional increase in current (in absolute value) induced by the leakage inductance $L_{lk}$ and the secondary-side short-circuiting can be seen in FIG. 4b, at the point 409b in the region of the end of the freewheeling phase $II_B$, while SR1 and SR2 are on. This increase in current occurs before the transition phase 404b, while in the same region II of FIG. 4a, without $T_{ZVS}$, a decrease in the current $I_{T1A}$ can be seen. As a result of the additionally injected current increase due to the discharge of coils $T3_B$ and $T1_A$, the magnetic energy, which is stored in the leakage inductance $L_{lk}$ of T1, increases until finally all the charge stored in the switches A, B of the lagging branch 107 is converted into magnetic energy of the leakage inductance $L_{lk}$, so that the switches A, B are essentially free of charges and the transition of the lagging branch A/B (lagging leg) 107 can be carried out under ZVS conditions. The current circulates through the leakage inductance. If the leakage inductance is too small, the current has to be increased to ensure sufficient energy for ZVS conditions.

4. In the transition phase 404a, 404b between phase II and III, the switch B 104b is switched off and the switch A 104a is switched on (turn-off B/turn-on A). This phase 404a, 404b "turn-off B/turn-on A" is referred to as the transition of the lagging branch 107 (lagging leg transition) A/B.

During the energizing phases I and III, the current increases continuously, but in the opposite direction, so that the current at points 405a, 405b differs from 0 A. The magnitude of the increase in current depends on the output power of the converter 100. This current ensures the ZVS conditions when the switches C, D of the leading branch 108 are switched.

During each of the freewheeling phases II and IV, the current decreases in the opposite direction. As can be seen in phases $II_A$ and/or $IV_A$, the conditions for ZVS switching of A and B are not achieved. Only if, as can be seen in phases $II_B$ and/or $IV_B$, a ZVS transformer is present and the switches SR1, SR2 are switched on at the identical time or at the same time, can ZVS conditions be achieved for the switching of A and B. Alternatively or additionally, the leakage inductance of T1 could also be increased, but this can result in losses in the output capability and is therefore only carried out to a small extent when it is carried out.

Thus, after a sudden increase in the current $I_{T1A}$ in the transition phase 406a, 406b, the current flow $I_{T1A}$ may decrease during the freewheeling phase II until the end region $II_A$, $II_B$ is reached. Up to the end region $II_A$, $II_B$, the curves of the current $I_{T1A}$ of FIGS. 4a and 4b correspond regardless of whether the ZVS transformer $T_{ZVS}$ is present or not.

Essentially, only the linearly increasing current $I_{T1A}$ during phases $II_B$ and $IV_B$ is used for the ZVS switching of A and B when the ZVS transformer is present. The current pulse of the current $I_{T1A}$, immediately after the switching of A and B, relates to interactions with the parasitic capacitances of the circuit and it can be neglected. The different influencing of the current flow $I_{T1A}$ with and without ZVS transformer $T_{ZVS}$ in the end region $II_A$, $II_B$ of the freewheeling phase II is responsible for the different behavior of a circuit with ZVS transformer and without ZVS transformer.

4.a) If the PSFB is used without a transformer $T_{ZVS}$ being present, as shown in FIG. 4a, the phase 404a of the transition of the lagging branch 107 is a critical phase, since it follows the freewheeling phase II. This is because, as can be seen both in FIG. 4a and in FIG. 5a at reference number 407a, voltage is still present across switch A in the region of transition 404a of lagging branch 107 while switch A is actuated. The actuation of the switch is shown at the reference sign 408a. In the example that the switch A is implemented by a MOSFET, the switch A is activated at its gate in the region 408a, wherein the entire voltage $V_{DSA}$ is still applied to its drain-source terminal in this time range.

As a result of the low current $I_{T1A}$ during phase $II_A$, the magnetic energy stored in inductance $T1_A$ is not sufficient to completely discharge the parasitic capacitances of the switches A and B and the primary coil $T1_A$ when a low load is connected to the output 110a, 110b. Only in the case of a large load would a current occur in the leakage inductance which would be large enough to cause ZVS conditions in the switches A, B of the lagging branch 107. In FIG. 4a, however, a low load is assumed and therefore hard switching of the switches A and B occurs. Admittedly, the time range in which soft (ZVS) switching can take place can be increased, by the value of the inductance of the primary coil $T1_A$ being increased. However, from a certain value onwards there is the risk that the output capability of the DC-DC converter 100 or the efficiency of the converter output 110a, 110b is endangered.

FIG. 5a shows the detail 404a in the region of the transition of the lagging bridge branch 107 (lagging leg transition) for the case that no transformer $T_{ZVS}$ is provided.

4.b) If the ZVS transformer $T_{ZVS}$ is provided according to the example embodiment according to FIG. 1 of the invention, as shown in FIGS. 4b, 5b, by activating the switches SR1, SR2 during the end phase $II_B$, an increased current $I_{T1A}$ can flow during the end phase $II_B$. Because of the increased current flow in the end phase $II_B$, a soft transition can be created when switching A and B. The current $I_{T1A}$ does not stop at the point 405b, but rather continues to flow, in particular, it continues to rise during the end phase $II_B$ of the freewheeling phase II up to the point 409b. This increase in current flow is caused by the ZVS transformer, which increases the effects of switching the secondary-side switches SR1, SR2 or the secondary-side rectifiers SR1, SR2 on the primary side.

In this case, the ZVS transformer $T_{ZVS}$, i.e., the combination of the coils $T3_A$ or $T3_B$, has the function during the freewheeling phase II or IV and in particular in an end region $II_B$ or $IV_B$, i.e., during the time interval during which the switches SR1, SR2 are activated at the same time and short-circuit the secondary coil $T1_B$, of increasing the primary current $I_{T1A}$. Since the low-side switches B and D are switched on during the freewheeling phase II, the voltage across $T3_B$ is kept at 0V during the freewheeling phase II. The voltage reflected from the secondary side into the primary coil is thus also zero. However, the voltage across the coil $T3_A$ is half the input voltage ½ $V_{in}$. The voltage across $T3_B$ is kept at 0V during the freewheeling phase II. While the voltage of the $T3_A$ winding is not equal to zero, the current increases linearly through the ZVS transformer $T_{ZVS}$. This current is proportional to the time at which SR1 and SR2 are activated and inversely proportional to the leakage inductance of $T_{ZVS}$.

Since the voltage via the low-side switch B is kept at 0V during the freewheeling phase II, the switch B can be switched over during the transition phase 404b immediately after the freewheeling phase II under ZVS conditions; in particular, the low-side switch B can be switched off under ZVS conditions. After the switching of the switch B, the current additionally injected by the coil $T3_A$ into the coil $T3_B$ is conducted to the connection node 105 between the switches A and B and helps all the charge in the parasitic elements of the high-side switch A and/or all voltage across the high-side switch A to be dissipated and to ensure ZVS conditions for switching the switch A. Thus, the high-side switch A of the lagging branch 107 can be switched by a small dead time after the low-side switch B of the lagging branch 107 under ZVS conditions, as shown in FIG. 5b. As the detail in FIG. 5b shows, A is actuated after $V_{DS}=0$ applies and thus the voltage across A is essentially zero volts.

In one example, it may be the case that the two switches A, B of the lagging branch 107 are switched essentially simultaneously during the transition phase 406b. In another example, it may be the case that the high-side switch A of the lagging branch 107 is switched in time after the low-side switch B of the lagging branch 107. In yet another example, it may be the case that the high-side switch A of the lagging branch 107 is switched during phase III after the low-side switch B of the lagging branch 107, which is switched during the freewheeling phase II. In yet another example, it may be the case that the low-side switch B of the lagging branch 107 is switched before the second synchronous rectifier SR2 and the high-side switch A of the lagging branch 107 is switched after the second synchronous rectifier SR2.

The same applies when the switches A, B of the lagging branch 107 are switched after the freewheeling phase IV. However, the current $I_{T1A}$ flows during the energizing phases III and the freewheeling phase IV in the opposite direction compared to that of the energizing phase I and the freewheeling phase II. Coming out of the energizing phase III, the switch A is switched on and the switch B is switched off. The freewheeling phase IV begins with the switching of the switches C, D of the leading branch 108. A loop or freewheeling loop is formed in the upper region of the circuit at the high terminal 109. The freewheeling loop has the switch A, the coil $T3_B$, the coil $T1_A$, the high-side node 102, and the switch C. The voltage is also kept at 0V in this freewheeling loop. When leaving the freewheeling phase IV in the end phase $IV_B$, the switch A of the lagging branch 107, which is located in the freewheeling loop, is therefore again switched first. Since the voltage in this freewheeling loop is kept at 0V, the switch A of the lagging branch can be switched under ZVS conditions. When this switch is switched, the additional current generated by switching the synchronous rectifiers SR1, SR2 can also be used to switch the second switch B under ZVS conditions.

The switching behavior of the switches A 104a, B 104b, C 104c, D 104d is the same in FIGS. 4a, 4b, 5a, 5b, regardless of whether the ZVS transformer $T_{ZVS}$ is present, as assumed in FIGS. 4b, 5b, or not present, as assumed in FIGS. 4a, 5a. This switching behavior corresponds to the switching behavior of a phase-shifted full bridge (PSFB), so that the ZVS transformer $T_{ZVS}$ can be retrofitted in every PSFB without changing the switching behavior.

The ZVS transformer $T_{ZVS}$ ensures the current increase 409a in the end phase $II_B$ of the freewheeling phase II or the current increase with the opposite sign in the end phase $IV_B$ of the freewheeling phase IV.

During the freewheeling phase II and also during the freewheeling phase IV, the input voltage is the sum of the drain voltages $Vds_A$ and $Vds_B$ if the switches A and B are implemented as MOSFETs.

$$V_{in}=Vds_A+Vds_B$$

FIG. 5b shows the detail in the region of the switching interval 404b or the transition phase 404b. At the switching time 407b of switches A and B of the lagging branch 107 (lagging leg transition), the voltage across switch A has dropped to essentially 0V for the case that a transformer $T_{ZVS}$ is provided, so that ZVS switching is possible.

In contrast, without transformer $T_{ZVS}$, no ZVS switching is possible at the switching time 407a of the switch B, as shown in FIG. 5a.

The switches A, B are connected in series in the first bridge terminal 105 and the switches C, D are connected in series in the second bridge terminal 106. The first bridge connection 105 and the second bridge connection 106 are also connected via a series circuit of the coil $T3_B$ and the primary coil $T1_A$ of the main transformer T1. The coil $T3_B$ of the main transformer can be considered to be an additional coil $T3_B$ to the primary coil $T1_A$, since it can be used to increase the total inductance of the series circuit made up of $T1_A$ and $T3_B$. A high total inductance between the nodes 105 and 106 can improve the ZVS behavior of bridge circuit 101.

The additional coil $T3_B$ can be coupled to a current injection device $T3_A$ or a current injection device $T3_A$. In the example in FIG. 1, the current injection device $T3_A$ is also a coil $T3_A$. The coil $T3_B$ can be coupled to the additional coil $T3_B$ with low magnetic coupling and thus form the additional transformer $T_{ZVS}$ or the ZVS transformer $T_{ZVS}$. Using a small transformer $T_{ZVS}$ with low magnetic coupling, the ZVS switching of the switches A and B can be achieved. The current injection device $T3_A$ forms the primary coil $T3_A$ of the additional transformer $T_{ZVS}$ and the additional coil $T3_A$ forms the secondary coil $T3_A$ of the additional transformer $T_{ZVS}$.

Due to the series circuit of the auxiliary transformer $T_{ZVS}$ with the main transformer T1, a good output capability may be achieved for the phase-shifted full bridge. If the input voltage $V_{in}$ falls below a predeterminable value, the DC-DC converter cannot generate a voltage that is able to supply a load connected to the output 110a, 110b, for example, the output of the DC-DC converter cannot charge a 12V battery if the input voltage $V_{in}$ is too low. If a current injection device $T3_A$ or a primary winding $T3_A$ is provided, which is coupled to a secondary coil $T3_B$, which is connected in series with the primary coil $T1_A$ of the main transformer, this performance of the output 110a, 110b can be increased. The good output capability can therefore be characterized in that even at a low input voltage $V_{in}$, a load at the output of the DC-DC converter can still be supplied with power, which may then also be low because of the low input voltage $V_{in}$.

Due to this good output capability, efficient battery applications can be made possible, for example, auxiliary DC-DC converters for electric vehicles (EV) and plug-in hybrid electric vehicles (PHEV) in which the voltage range $V_{in}$ can be large as a function of the state of charge of the high-voltage battery (HV battery) connected to the high-side node 102 and the low-side node 103.

All switches A, B, C, D connected to the primary coil $T1_A$ of the main transformer T1 are referred to as primary switches. These can be implemented with the aid of MOSFETs A, B, C, D. In order to enable a ZVS for all primary switches A, B, C, D, the series circuit of the additional coil $T3_B$ with the primary coil $T1_A$ of the main transformer T1 is provided. The additional voltage at the additional coil $T3_B$ makes it possible to achieve the good output capability at the output 110.

The voltage drop across $T3_B$ influences the performance of the output 110 and the addition of a primary coil $T3_A$, which is magnetically coupled to $T3_B$, increases the performance of the output by increasing the voltage that is applied to the primary side of the main transformer T1. $T_{ZVS}$ has a twofold effect on increasing the performance of the output.

On the one hand, the voltage applied to the primary coil $T1_A$ of the main transformer T1 increases by a value given by the formula $$\frac{V_{in}}{n_{ZVS}}.$$

The output voltage $V_{out}=V_o$ results from the increased input voltage of the transformer as:

$$V_o = \frac{V_{in}}{n_{tr}}\left(1 + \frac{1}{n_{ZVS}}\right)D \quad (7)$$

Here $n_{tr}$ is the number of turns of the main transformer T1.

A ZVS transformer $T_{ZVS}$ can reduce the switching losses. With or without ZVS transformer $T_{ZVS}$, it takes a predetermined time until a primary voltage at the primary coil $T1_A$ also appears at the secondary coil $T1_B$ after this primary voltage has been applied to the primary coil $T1_A$ of transformer T1. This delay occurs because the primary current through $T1_A$ first has to pass from a freewheeling state to a state in which the output current is reflected at the primary coil $T1_A$. It is true that it is desirable to increase the stored magnetic energy in order to enable long freewheeling in which the magnetic energy is dissipated. If this magnetic energy were increased by providing a high inductance of $T_{1A}$, this would result in high switching losses (duty loss). By using the ZVS transformer, the magnetic energy can be increased by providing a current without increasing the inductance of $T_{1A}$.

In other words, by providing the ZVS transformer $T_{ZVS}$, a high level of magnetic energy can be stored in the system, but with a low leakage inductance of $T_{1A}$ and thus the switching losses (duty loss) can be reduced. The storage of a high level of magnetic energy is necessary in order to establish ZVS conditions for the transition of the switches A, B of the lagging branch 107, in particular if the switches A, B are implemented as MOSFETs. The ZVS transformer $T_{ZVS}$ is dimensioned in such a way that, in particular, the magnetic energy that enables the ZVS transition of the lagging branch 107 is stored. Storing a high level of magnetic energy does not essentially improve the switching behavior.

Since the ZVS transformer also has a leakage inductance, the ZVS transformer stores the magnetic energy in its leakage inductance. This magnetic energy is proportional to the peak current which flows through the ZVS transformer $T_{ZVS}$. This peak current is in turn proportional to the time interval of the freewheeling phase during which the switches SR1 and SR2 are switched on at the same time. The leakage inductance of the ZVS is established during the design of the circuit so that it can absorb enough energy for inducing ZVS conditions, and thereafter can be difficult to change, therefore the current which is required to provide ZVS conditions is controlled by the period during which the switches SR1 and SR2 are switched on at the same time during the freewheeling phase.

The time required for the transition between the two freewheeling states in the freewheeling phases II and IV can be viewed as a switching loss (duty loss), which can be quantified as follows:

$$\Delta D = \frac{\Delta I}{V_{in}} L_{lk} f \quad (8)$$

Here, $\Delta I$ is the current difference between the current through $T1_A$ after the transition phase 404a, 404b "turn-off B/turn-on A" i.e., after the phase 404a, 404b of the transition of the lagging branch 107 (lagging leg transition) as described in 4. and the current through the primary coil $T1_A$ after the phase when the primary voltage generated by the output current appears at the secondary coil $T1_B$, i.e., the point in time that the output current is reflected at $T1_A$ (reflected output current).

$\Delta D$ is a time value corresponding to a region along a time axis and f is the frequency of the PWM. $\Delta D$ Is the period of time it takes for the current to change. This period of time $\Delta D$ is to be as short as possible in order to achieve a good output voltage capability.

The time interval $\Delta D$ increases with increasing load at output 110, since the current difference $\Delta I$ increases. This increase in the switching losses $\Delta D$ can only take place in a limited range, since from a certain value they are so severe that the output 110 is no longer capable of providing the required output voltage $V_{out}$, for example, for charging a 12V battery.

In a standard PSFB without $T_{ZVS}$, the ZVS region, i.e., the range of input voltages yin at which ZVS is possible, can be increased by increasing the inductance of the primary coil $T1_A$, but then the switch-on losses (duty cycle losses) increase, since it is necessary to wait longer and longer until the high level of stored magnetic energy has dissipated the parasitic voltages of switches A, B, C, D to enable switching under ZVS conditions. This is because if higher voltages $v_{in}$ are applied to switches A, B, C, D, higher parasitic voltages are also stored in the switches. However, it is desirable to operate the bridge circuit 101 with the highest possible PWM switching frequency f and thus with the lowest possible $\Delta D$.

By providing $T_{ZVS}$, the ZVS region, i.e., the range of input voltages $V_{in}$ at which the DC-DC converter circuit 100 can still be operated efficiently, can be increased by increasing the current $I_{T1A}$, which flows during the freewheeling phase II through $T1_A$, while at the same time the leakage inductance $L_{lk}$ of the transformer T1 is kept low. Although $\Delta I$ is also increased, which increases switch-on losses, more magnetic energy can also be stored at the same time. If the current is increased, more magnetic energy can be stored, but power losses and/or line loss (RMS (Root Mean Square) losses) also increase. Soft switching or ZVS switching, however, reduces the line losses.

In the circuit of FIG. 1, the primary side of the DC-DC converter is configured as a phase-shifted full bridge (PSFB) with an additional small transformer $T_{ZVS}$, to assist the zero voltage switching (ZVS) of the primary-side switches A and B of the lagging branch 107. By providing the transformer $T_{ZVS}$, the stored magnetic energy can be increased by injecting a current; in particular, the current can be used to neutralize parasitic charges on the switches A, B, C, D and in particular on the switches A, B of the lagging branch 107. This neutralization can take place very quickly, so that the DC-DC converter 100 can work at a high switching frequency f.

For the primary-side switches C and D of the leading branch 108 (leading leg), in a PSFB soft switching or ZVS switching can be implemented essentially always, thus regardless of whether the ZVS transformer $T_{ZVS}$ is present or not.

The DC input voltage $V_{in}$ corresponds to the voltage of the HV battery. The voltage $V_{in}$ can be in a range from 240V to 470V or at 400V to 800V for applications with more powerful HV batteries, such as those used in electric buses or high-performance electric cars. The fluctuation of the input voltage $V_{in}$ can depend on the state of charge of the HV battery. The duty cycle of the PWM used depends on the applied input voltage $V_{in}$. However, it may be necessary to provide other types of switching devices A, B, C, D and other transformers T1, $T_{ZVS}$ if different voltage ranges are to be supplied, for example, 240V to 470V or 400V to 800V.

The same voltages are applied to the primary switches A, B, C, D as to the points 105, 106. Since $V_{in}$ can fluctuate over a wide range due to the change in the state of charge of the HV battery, for example, in the range from 240V to 470V, a control loop is provided in the DC-DC converter (not shown in FIG. 1) that controls the duty cycle of the control signal of the switches A, B, C, D to keep the output voltage $V_{out}$ at a constant value, for example, $V_{out}$=14.5V or $V_{out}$=12V. However, if, for example, the input voltage drops from 470V to 240V, the duty cycle and/or the frequency of switches A, B, C, D has to be increased to ensure a stable and/or constant output voltage $V_{out}$. The duty cycle is determined from the quotient of the duration of the energizing phase I and the sum of the duration of the energizing phase I and the duration of the freewheeling $$\text{phase } II \left( \text{Duty Cycle} = \frac{\text{Duration of the Energizing Phase } I}{\text{Duration of the Energizing Phase } I + \text{Duration of the Freewheeling Phase } II} \right).$$

The frequency for the control signals for A, B, C, D, SR1, SR2 remains constant and is not varied.

Since the energy transmission and/or power transmission via the main transformer T1 depends on the primary voltage, only a low power and/or energy could be transmitted via the main transformer T1 due to the reduced primary voltage and the power that can be provided with the voltage $V_{out}$ would be reduced.

In other words, a high inductance is desired in the connecting circuit between 105 and 106, to provide a high level of magnetic energy for discharging the switches A, B of the lagging branch 107 at a high input voltage $V_{in}$ and to thereby enable ZVS switching. However, if the inductance provided by the inductance of the primary coil $T1_A$ were to be increased more and more by a series circuit of an additional inductance $T3_B$, the performance of the output voltage $V_{out}$ or the output power would be reduced more and more, since the discharging of the switches A, B of the lagging branch 107, in particular at high voltages $V_{in}$, could either not take place quickly enough or could not take place completely. This means that the DC-DC converter could only be operated in very low voltage ranges.

While the primary side of the main transformer T1 is essentially applied at the high voltage $V_{in}$ of 240V-470V, at the secondary side $T1_B$ of the main transformer T1, a DC voltage of 14.5V or a voltage in the range of approximately 12V to 15V is applied, which is provided as the output voltage $V_{out}$, for example, a radio or other consumer of the vehicle electrical system.

The provision of the additional transformer $T_{ZVS}$ compensates for the loss of the output power by increasing the voltage that is applied to the primary coil $T1_A$ of the main transformer T1. Since the primary coil $T1_A$ of the main transformer T1 is connected in series with the secondary coil $T3_B$ of the ZVS transformer, the output voltage capability increases. To compensate for this influence, the primary coil $T3_A$ is provided, which is connected between the switching node 105 and the fixed potential 111. A voltage that is applied on the primary coil $T3_A$ generates a voltage on the secondary coil $T3_B$. This voltage on the secondary coil $T3_B$ increases the voltage on the primary coil $T1_A$ and ensures good output voltage capability.

In this way, the single-stage DC-DC converter can be operated with a large input voltage range and ZVS can still be guaranteed for all primary-side MOSFETs A, B, C, D. A single-stage DC-DC converter is a DC-DC converter that converts a first voltage level into a second voltage level only once without generating further intermediate voltage levels.

One side or one terminal of the primary coil $T3_A$ of the additional transformer $T_{ZVS}$ is connected to the first bridge terminal 105 and to one side of the additional coil $T3_B$ or the secondary coil $T3_B$ of the additional transformer $T_{ZVS}$. The other side or the other terminal of the primary coil $T3_A$ of the additional transformer $T_{ZVS}$ is connected to a third bridge branch 109, which is formed as a series circuit of two capacitors C1 and C2. This other side of the primary coil $T3_A$ of the additional transformer $T_{ZVS}$ is connected between the first capacitor C1 and the second capacitor C2. The third bridge branch 109 is connected to the first input terminal 102 and the second input terminal 103 and is connected in parallel to the first 107 and second 108 bridge branches. The third bridge branch 109 ensures that a connection of the coil $T3_A$ is kept at a fixed or constant potential. A voltage change in the primary coil $T3_A$ of the ZVS transformer, which injects a current into the secondary coil $T3_B$, thus depends on a change in potential at the bridge points 105 and 106. The pulse reflected by the switching of the synchronous rectifiers SR1, SR2 in the primary coil $T1_A$ thus also has an effect on the additional transformer $T_{ZVS}$.

On the output side, the series circuit of a first synchronous rectifier (Synchronous Rectifier, SR) SR1 and a second synchronous rectifier (Synchronous Rectifier, SR) SR2 is connected in parallel to the secondary coil $T1_B$ of the main transformer T1.

These are connected via a first output coil L1 and a second output coil L2 as well as an output capacitor C0 to the output 110 of the DC-DC converter 100, via which the output voltage $V_{out}$ is provided. The synchronous rectifier SR1, SR2 is operated in such a way that the positive or negative half-wave induced in the secondary coil $T1_B$ is passed on to the smoothing capacitor $C_0$ with the same polarity, so that a DC output voltage $V_{out}$ is generated.

Figure 2:
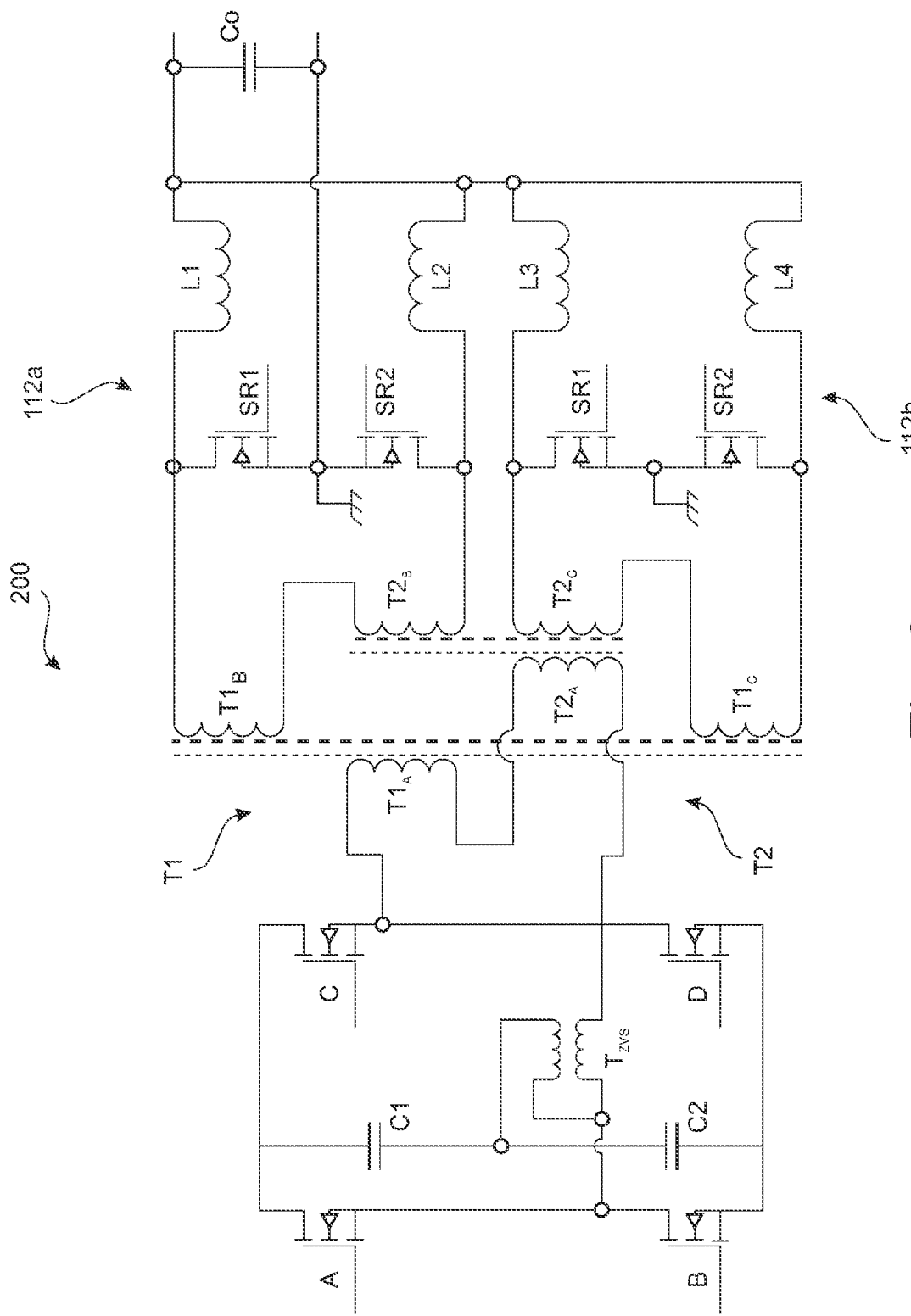
FIG. 2 shows a block diagram of a DC-DC converter having a bridge circuit and two main transformers according to one example embodiment of the present invention.

FIG. 2 shows a block diagram of a DC-DC converter 200 having a bridge circuit 101 and two main transformers T1, T2 according to one example embodiment of the present invention. In this configuration, the current on the secondary side of the main transformer 1 is divided between four coils L1, L2, L3, L4 and four synchronous rectifiers SR1, SR2, SR1', SR2', whereby the efficiency of the circuit and the treatment of the current may be simplified. In addition, the main transformer T1 from FIG. 1 is divided into the two main transformers T1, T2. The primary coil $T1_A$ of the first main transformer is coupled to the secondary coils $T1_B$ and $T1_C$ of the first main transformer. The primary coil $T1_A$ of the first main transformer is coupled to the secondary coils $T1_B$ and $T1_C$ of the first main transformer. The output circuits 112*a*, 112*b* essentially correspond to the output circuit 112 from FIG. 1. However, a secondary side of the two transformers T1, T2 is used in each of the output circuits 112*a*, 112*b*. In this case, the synchronous rectifiers SR1 and SR1' are operated in the same way and the synchronous rectifiers SR2, SR2' are operated in the same way.

Figure 3:
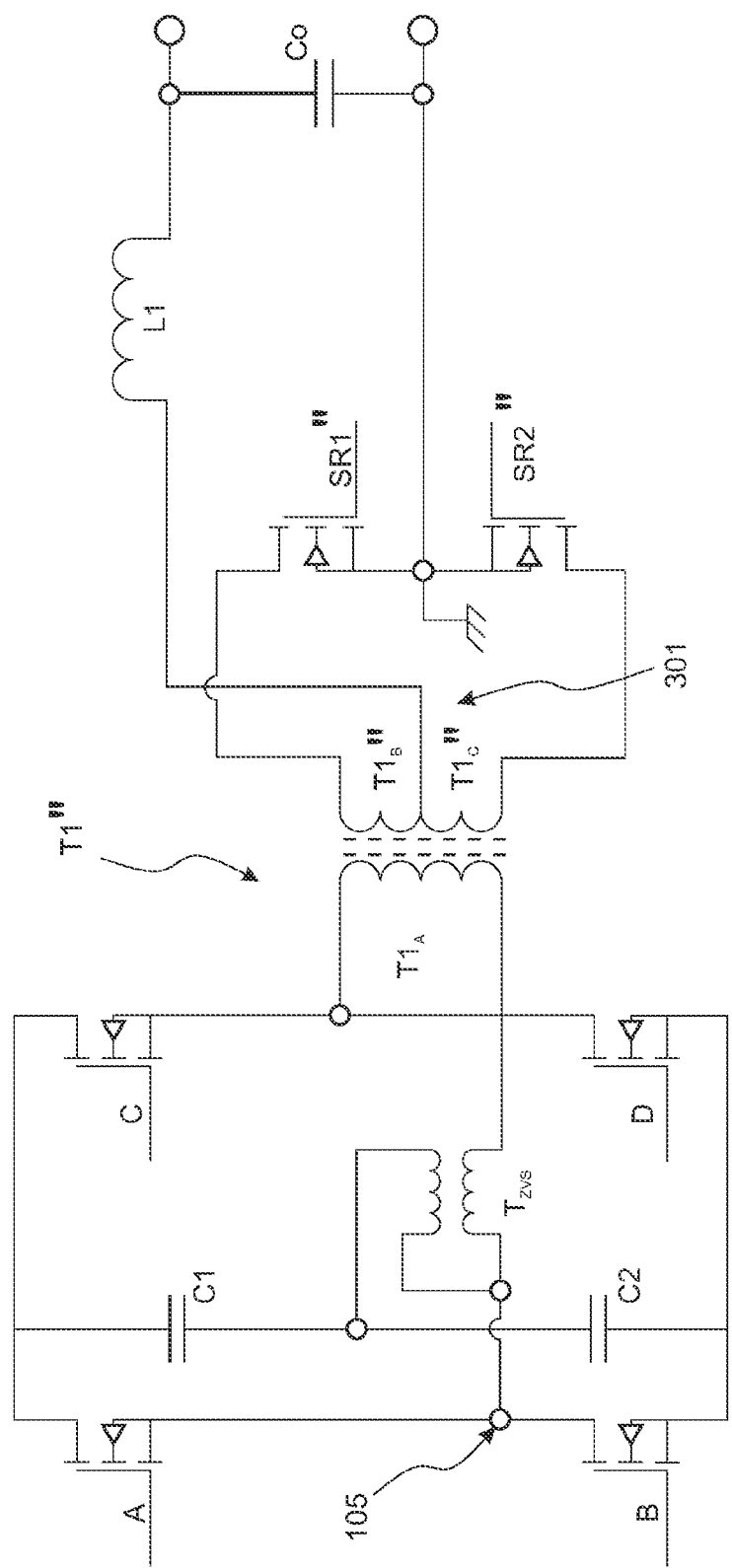
FIG. 3 shows a block diagram of a DC-DC converter having a bridge circuit and a main transformer having center tap according to one example embodiment of the present invention.

FIG. 3 shows a block diagram of a DC-DC converter having a bridge circuit and a main transformer having center tap according to one example embodiment of the present invention. In this circuit variant, only one output coil L1 is provided.

The converter circuits shown in FIGS. 1-3 can be used both as a current doubler and as a center tap configuration on the secondary side. The center tap 301 is arranged on the secondary side of the main transformer T1" and is connected to the two partial secondary coils T1$_B$" and T1$_C$" and the coil L1. The two partial secondary coils T1$_B$" and T1$_C$" are also connected to the rectifiers SR1" and SR2". There is a ground terminal between the rectifiers SR1" and SR2", which is also connected to one of the output terminals. The capacitor C0 is connected in parallel to the output.

The switching behavior with and without ZVS transformer is shown enlarged in FIGS. 5a, 5b. The voltage curves Vds$_A$ across the high-side switch A of the lagging branch (lagging leg) A/B is included for a case in which no load is applied at output 110, that is, for the load-free case or idling. In order to inject an additional current into the secondary coil T3$_B$, the synchronous rectifiers SR1 and SR2 are switched on at the same time during the freewheeling phase II$_B$ of the low-side switches B, D to generate a short pulse across the secondary coil T1$_B$ due to the voltage drop to 0V output voltage, which is transferred to the primary coil T1$_A$. The curve Vds$_A$ of FIG. 5b corresponds to the case in which the additional transformer T$_{ZVS}$ in series with the main transformer T1 is present, as shown in FIG. 1.

In phase III, switch A is closed and switch B is open. It can be seen that during the switching phase 404a, 404b, the initial voltage of approximately V$_{in}$=400V across A and B for the case that T$_{ZVS}$ is used, has already dropped to 0V before the switching phase 404b, as indicated at point 407b, whereas the voltage V$_{in}$=400V for the case that T$_{ZVS}$ is not used, still has a voltage at the end of the switching phase 404a, as indicated at point 407a. Thus, when using the ZVS transformer T$_{ZVS}$, ZVS switching is also possible in the load-free case. This is because according to FIG. 1, the additional transformer T$_{ZVS}$ is connected in series with the main transformer T1 and helps to inject a current into the coil T3$_B$ of the additional transformer. ZVS switching of the high switch A 104a can be achieved independently of the load at the output 110a, 110b. This is because if there is no load at the output, the output current is 0 A and the output load R$_{load}$ is undefined. The output voltage V$_{out}$ is regulated to a constant 14.5V regardless of the load, for example, by changing the frequency and/or the duty cycle of the PWM switches A, B, C, D.

The energizing phase III is followed by a further freewheeling phase IV, namely the freewheeling phase of the high-side switches A 104a and C 104c. In this a freewheeling circuit is formed from switches A 104a, C 104c, additional coil T3$_B$, and primary coil T1$_A$.

With the phase-shifted full bridge topology (PSFB) having an additional inductance T3$_B$, which is connected in series with the transformer T1, ZVS switching or soft switching may thus be achieved if the additional inductance T3$_B$ is part of a transformer T$_{ZVS}$. The additional transformer T$_{ZVS}$ has a low coupling factor between the primary coil T3$_A$ and the secondary coil T3$_B$. The low coupling is achieved, for example, by a magnetic core having a slot. Energy that can be used for ZVS can be temporarily stored in the additional transformer T$_{ZVS}$. Due to the low coupling of the ZVS transformer T$_{ZVS}$, a leakage inductance is retained in T$_{ZVS}$, because the part of the magnetic flux which does not couple into the secondary coil is noticeable as leakage inductance. This additional leakage inductance can be viewed as a further inductance which is in series with T3$_B$, even if the leakage inductance is not a tangible component. The size of the leakage inductance can also be influenced via the coupling factor. The leakage inductance can also store magnetic energy, which can then be converted back into an electrical current flow to assist ZVS in that the bridge point 105 is discharged.

If a configuration having only one additional coil T3$_B$ without primary coil T3$_A$ or further coil T3$_A$ is used, i.e., not a complete transformer T$_{ZVS}$ but only a coil is connected in series with the main transformer, the output power of the DC-DC converter is reduced, since a voltage drops across the coil T3$_B$ during switching, which then reduces the voltage on the primary coil T1$_A$ of the main transformer. As shown in FIGS. 4a and 5a in phase 404a, a real ZVS of the high-side switch A cannot be achieved with such a configuration with only one additional coil T3$_B$, even with a low load, since the current through the additional coil T3$_B$ is too low. The coil T3$_B$ without T3$_A$ can only be used to achieve ZVS switching of the low-side switch B.

If, however, a complete ZVS transformer T$_{ZVS}$ according to FIG. 1 is used, an additional current can be injected into the coil T3$_B$ by switching the synchronous rectifiers SR1, SR2 and thus the effect of the magnetic energy in the leakage inductance of the transformer T$_{ZVS}$ can be used. The energy E=½*(L*I$^2$) can be controlled via the current, which is determined by the length of time during which SR1 and SR2 are activated at the same time. The ZVS transformer T$_{ZVS}$ thus contributes by activating the synchronous rectifiers SR1, SR2 over a predetermined period of time II$_B$ to increasing the primary current I$_{T1A}$ by an amount as is required in the freewheeling phase II of the switch for ZVS switching of the lagging branch 107.

By using an additional complete transformer T$_{ZVS}$, a very efficient and cost-effective single-stage DC-DC converter can thus be implemented. In addition, ZVS switching can be achieved in the primary switches A, B, C, D, regardless of the load at the output 110. In addition, a high output power can thus be provided at the output 110, which can be important, in particular, for applications having a large input voltage range V$_{in}$.

It may be considered to be a concept of the present invention to increase the magnetic energy stored in the transformer T$_{ZVS}$ by increasing the primary current I$_{T1A}$ instead of increasing the inductance of the secondary coil T3$_B$, which would result in a reduction in the output power. Since the magnetic energy in the secondary coil T3$_B$ is according to formula (3)

$$E_L = \frac{1}{2} L_{T3B} I^2,$$

increasing the primary current I$_{T1A}$ is more efficient than increasing the inductance of the secondary coil T3$_B$. Since the duty cycle loss also depends on the inductance via the ratio $$\frac{V_{in}}{L},$$

increasing me current by injecting an additional current helps to keep the ratio essentially unchanged, and increasing the stored magnetic energy without increasing the switch-on losses.

Each additional inductance connected in series, which is present as a real component or as a leakage inductance, reduces the output capability of the output 110 of the DC-DC converter 100, for example, in relation to an output voltage $V_{out}$ to be constantly provided as a function of a wide range of available input voltages $V_{in}$. This reduction of the output capability can have a negative effect if the output voltage $V_{out}$ of the converter 100 is to be regulated to a constant output voltage, for example, 14.5V, and the input voltage varies over a wide range, for example, in the range from 240V to 470V, depending on the state of charge of an HV battery. This is because the inductance connected in series may be necessary to enable soft switching under ZVS conditions. An inductance connected in series would degrade the output capability of the converter 100, since it is no longer possible, for example, to generate a constant output voltage of 14.5V if the input voltage $V_{in}$ is at a lower range limit, for example, at 240V of a range of 240V to 470V, and at the same time ZVS conditions are to be complied with. This is because it would actually be desirable to manage without any series inductance $T3_B$. However, ZVS would not be possible and the efficiency of the converter would be low.

Since, in addition, large inductances are not required for $T3_B$, the size of a DC-DC converter can be kept small, although it is operated with a high switching frequency f. The high switching frequencies are possible because of the rapid discharge of node 105 and are the same for the switches A, B, C, D and are determined by the duration of phases I, II, III, IV.

In addition, it is to be noted that "comprising" and "having" do not exclude any other elements or steps and that "one" or "a" does not exclude a plurality. Furthermore, it is to be noted that features or steps that have been described with reference to one of the above example embodiments can also be used in combination with other features or steps of other example embodiments described above. Reference signs in the claims are not to be regarded as a restriction.

The invention claimed is:

1. A bridge circuit comprising:
a first high-side switch and a second high-side switch;
a first low-side switch and a second low-side switch, the first high-side switch and the first low-side switch connected at a first bridge terminal in a series circuit to form a first bridge branch, and the second high-side switch and the second low-side switch connected at a second bridge terminal in a series circuit to form a second bridge branch, the first bridge branch and the second bridge branch connected in a parallel circuit at a first input terminal and a second input terminal;
a high-side capacitor and a low-side capacitor connected in a series circuit at a third bridge terminal to form a third bridge branch, the third bridge branch connected to the first input terminal and the second input terminal;
a first transformer comprising a primary coil and a secondary coil, the secondary coil comprising a first output terminal and a second output terminal; and
a second transformer comprising a first coil and a second coil, the first coil connected to the primary coil in a series circuit to connect the first bridge terminal to the second bridge terminal, the second coil being a current injection device configured to inject a predetermined current into the first coil at a predetermined point in time, the second coil configured to connect the third bridge terminal to at least one of the first bridge terminal and the second bridge terminal.

2. The bridge circuit as claimed in claim 1, wherein a coupling between the second coil and the first coil of the second transformer is less than a coupling between the primary coil and the secondary coil of the first transformer.

3. The bridge circuit as claimed in claim 1, further comprising a synchronous rectifier connected to the first output terminal and the second output terminal.

4. The bridge circuit as claimed in claim 1, further comprising a control device connected to each of high-side switches and low-side switches, the high-side switches including the first high-side switch and the second high-side switch, and the low-side switches including the first low-side switch and the second low-side switch, wherein the control unit is configured to operate the high-side switches and the low-side switches so that at the predetermined time, the predetermined current from the current injection device is injected into the first coil.

5. The bridge circuit as claimed in claim 4, wherein the control device is further configured to operate the high-side switches, the low-side switches, as well as secondary-side switches including a first synchronous rectifier and a second synchronous rectifier in such a way that the predetermined current is injected into the first coil when at the predetermined point in time, the current through the first coil is below a predeterminable threshold value.

6. The bridge circuit as claimed in claim 4, wherein the control device is further configured to operate the secondary-side switches in such a way that the predetermined current is injected into the first coil.

7. A DC/DC converter comprising the bridge circuit as claimed in claim 1.

8. A method of operating a bridge circuit, wherein the bridge circuit comprises: high-side switches including a first high-side switch and a second high-side switch; low-side switches including a first low-side switch and a second low-side switch, the first high-side switch and the first low-side switch connected at a first bridge terminal in a series circuit to form a first bridge branch, the second high-side switch and the second low-side switch connected at a second bridge terminal in a series circuit to form a second bridge branch, the first bridge branch and second bridge branch connected in a parallel circuit at a first input terminal and a second input terminal; a high-side capacitor and a low-side capacitor connected in a series circuit at a third bridge terminal to form a third bridge branch, the third bridge branch connected to the first input terminal and the second input terminal; a first transformer comprising a primary coil and a secondary coil, the secondary coil comprising a first output terminal and a second output terminal; a second transformer comprising a first coil; and a second coil, the first coil connected to the primary coil in a series circuit to connect the first bridge terminal to the second bridge terminal, the second coil being a current injection device configured to inject a predetermined current into the first coil at a predetermined point in time, the second coil configured to connect the third bridge terminal to at least one of the first bridge terminal and the second bridge terminal, the method comprising:
operating the high-side switches and the low-side switches of the bridge circuit so that at the predetermined point in time, the current injection device injects the predetermined current into the first coil.

9. A non-transitory storage medium storing instructions to operate a bridge circuit, wherein the bridge circuit comprises: high-side switches including a first high-side switch and a second high-side switch; low-side switches including a first low-side switch and a second low-side switch, the first high-side switch and the first low-side switch connected at a first bridge terminal in a series circuit to form a first bridge branch, the second high-side switch and the second low-side switch connected at a second bridge terminal in a series circuit to form a second bridge branch, the first bridge branch and second bridge branch connected in a parallel circuit at a first input terminal and a second input terminal; a high-side capacitor and a low-side capacitor connected in a series circuit at a third bridge terminal to form a third bridge branch, the third bridge branch connected to the first input terminal and the second input terminal; a first transformer comprising a primary coil and a secondary coil; a second transformer comprising a first coil and a second coil, the first coil connected to the primary coil in a series circuit to connect the first bridge terminal to the second bridge terminal, the second coil being a current injection device configured to inject a predetermined current into the first coil at a predetermined point in time, the second coil configured to connect the third bridge terminal to at least one of the first bridge terminal and the second bridge terminal, wherein the instructions when executed by a processor cause h processor to perform operations comprising:

operating the high-side switches and the low-side switches of the bridge circuit so that at the predetermined point in time, the current injection device injects the predetermined current into the first coil.

\* \* \* \* \*